United States Patent
Koneru et al.

(10) Patent No.: US 12,468,895 B2
(45) Date of Patent: Nov. 11, 2025

(54) SYSTEMS AND METHODS FOR TRAINING A VIRTUAL ASSISTANT

(71) Applicant: Kore.ai, Inc., Orlando, FL (US)

(72) Inventors: Rajkumar Koneru, Windermere, FL (US); Prasanna Kumar Arikala Gunalan, Hyderabad (IN); Santhosh Kumar Myadam, Hyderabad (IN); Thirupathi Bandam, Hyderabad (IN); Girish Ahankari, Gachibowli (IN)

(73) Assignee: KORE.AI, INC., Orlando, FL (US)

( * ) Notice: Subject to any disclaimer, the term of this patent is extended or adjusted under 35 U.S.C. 154(b) by 380 days.

(21) Appl. No.: 17/845,388

(22) Filed: Jun. 21, 2022

(65) Prior Publication Data
US 2023/0409840 A1 Dec. 21, 2023

(51) Int. Cl.
*G06F 40/35* (2020.01)
*G06F 18/214* (2023.01)
*G06F 18/24* (2023.01)

(52) U.S. Cl.
CPC ............ *G06F 40/35* (2020.01); *G06F 18/214* (2023.01); *G06F 18/24* (2023.01)

(58) Field of Classification Search
CPC ........ G06F 40/35; G06F 18/214; G06F 18/24; G06F 40/30
See application file for complete search history.

(56) References Cited

U.S. PATENT DOCUMENTS

| | | | |
|---|---|---|---|
| 10,394,950 B2 | 8/2019 | Bethard et al. | |
| 10,459,835 B1 | 10/2019 | George et al. | |
| 10,553,202 B2 | 2/2020 | Amid et al. | |
| 10,592,613 B2 | 3/2020 | Gupta et al. | |
| 10,824,962 B2 | 11/2020 | Singaraju et al. | |
| 10,929,761 B2 | 2/2021 | Larson et al. | |
| 11,977,880 B2 * | 5/2024 | Koneru | G06F 8/71 |
| 2015/0161521 A1* | 6/2015 | Shah | G06F 3/0481 715/705 |
| 2015/0186156 A1* | 7/2015 | Brown | H04L 51/02 715/706 |
| 2016/0078860 A1* | 3/2016 | Paulik | G10L 15/063 704/244 |
| 2020/0137230 A1* | 4/2020 | Spohrer | H04M 7/0027 |
| 2021/0209441 A1 | 7/2021 | Sivakumar et al. | |
| 2021/0303764 A1* | 9/2021 | Sloss | G06F 21/64 |
| 2021/0304075 A1 | 9/2021 | Duong et al. | |
| 2022/0029981 A1* | 1/2022 | Mavani | H04L 63/0861 |
| 2022/0058347 A1 | 2/2022 | Singaraju et al. | |
| 2022/0165257 A1* | 5/2022 | Singh | G06F 40/284 |

(Continued)

*Primary Examiner* — Michael N Opsasnick
(74) *Attorney, Agent, or Firm* — Troutman Pepper Locke LLP

(57) ABSTRACT

A virtual assistant server determines a subset of test data corresponding to changes between a first version of training data of a virtual assistant and a second version of the training data of the virtual assistant. Subsequently, the virtual assistant server creates a test suite with the subset of test data and runs the test suite on a second language model of the virtual assistant created using the second version of the training data. Based on the running the test suite, the virtual assistant server generates one or more executable corrective actions to be implemented at the user device and provides the one or more executable corrective actions to the user device to implement to train the virtual assistant.

18 Claims, 7 Drawing Sheets

(56) References Cited

U.S. PATENT DOCUMENTS

2022/0366146 A1* 11/2022 Wei .................... G06F 40/40
2023/0199118 A1* 6/2023 Koneru ............. H04M 3/5166
　　　　　　　　　　　　　　　　　　　　379/88.01

* cited by examiner

| S. No | Executable corrective actions |
|---|---|
| 1. | Undo the change made to utterance U1 |
| 2. | add training utterances similar to the <constructed one or more utterances> to reduce false negatives |
| 3. | add the <constructed one or more utterances> to the training data to reduce false negatives |
| 4. | undo the change to the training utterance U4, as the change is not enabling the detection of any of the test utterances and the change is causing an increase in false negatives |

FIG. 3C

SYSTEMS AND METHODS FOR TRAINING A VIRTUAL ASSISTANT

FIELD

This technology generally relates to virtual assistants, and more particularly to methods, systems, and computer-readable media for training a virtual assistant.

BACKGROUND

Often, multiple stakeholders of an enterprise, such as developers, business analysts, or administrators, are involved in creating virtual assistants. The existing virtual assistant builders do not offer intuitive interfaces and a seamless and comprehensive way for the stakeholders to train the virtual assistants. In one example, stakeholders find it difficult to initiate and navigate through the training process of virtual assistants as the existing interfaces offer a complex journey of multiple web pages to train different intents or skills configured for each of the virtual assistants.

In another example, stakeholders use a training corpus or add training utterances, patterns, or rules to the virtual assistant builder to train the virtual assistant. The training data needs to be well crafted and should comprise a good variety and a sufficient number of utterances for accurate intent detection by the virtual assistant. As a result, creating the training data is a specialized task and novice developers may have difficulty creating the necessary training data. The stakeholders are sometimes provided with a set of guidelines to create the training data, however this often does not sufficiently reduce the difficulty on the stakeholders or result in the creation of the necessary training data.

In another example, the stakeholders often use test suites or trial and error based methods to try and understand the sufficiency of training of the virtual assistants, but often do not have a comprehensive understanding of this training process to be effective. As a result, this training issue again may hamper the intent detection capability of the virtual assistants.

In another example, the training provided by the stakeholders may result in erroneous intent detection. The stakeholder may provide a training utterance to detect a "transfer funds" intent. However, the utterance may correspond to a "pay bill" intent. The existing training methods do not enable a virtual assistant developer to effectively identify and correct these conflicts where the virtual assistant is configured with multiple intents. Accordingly, as illustrated above these existing training methods are time consuming, require a level of stakeholder expertise which may not be available, and are not efficient or effective. Hence there is a need to provide an efficient and effective way for all types of stakeholders to train the virtual assistants.

SUMMARY

In an example, the present disclosure relates to a method for assisting a user accessing a user device to train a virtual assistant. The method comprises determining a subset of test data corresponding to changes between a first version of training data and a second version of the training data. A test suite with the subset of test data is created and the test suite is run on a second language model of the virtual assistant created using the second version of the training data. Based on the running the test suite, one or more executable corrective actions to be implemented at the user device are generated. The one or more executable corrective actions are provided to the user device to implement to train the virtual assistant.

In another example, the present disclosure relates to a virtual assistant server comprising a processor and a memory. The memory coupled to the processor which is configured to be capable of executing programmed instructions stored in the memory to determine a subset of test data corresponding to changes between a first version of training data and a second version of the training data of a virtual assistant. Further, a test suite with the subset of test data is created, and the test suite is run on a second language model of the virtual assistant created using the second version of the training data. Based on the running the test suite, one or more executable corrective actions to be implemented at the user device are generated. The one or more executable corrective actions are provided to the user device to implement to train the virtual assistant.

In another example, the present disclosure relates to a non-transitory computer readable storage medium having stored thereon instructions which when executed by a processor, causes the processor to determine a subset of test data corresponding to changes between a first version of training data and a second version of the training data of a virtual assistant. Further, a test suite with the subset of test data is created, and the test suite is run on a second language model of the virtual assistant created using the second version of the training data. Based on the running the test suite, one or more executable corrective actions to be implemented at the user device are generated. The one or more executable corrective actions are provided to the user device to implement to train the virtual assistant.

BRIEF DESCRIPTION OF THE DRAWINGS

FIG. 3C is an example list of executable corrective actions generated by the virtual assistant server.

DETAILED DESCRIPTION

Examples of the present disclosure relate to a virtual assistant server environment and, more particularly, to one or more components, systems, computer-readable media and methods for training a virtual assistant. The virtual assistant server environment enables users such as developers or administrators of enterprises operating a client device to, by way of example, design, develop, deploy, manage, host, or analyze virtual assistants. A virtual assistant server of the virtual assistant server environment is configured to orchestrate natural language conversations. The one or more users at one or more of the user devices **130(1)-130(*n*) may configure and train the virtual assistants to converse with the customers of the enterprises in natural language. The one or more users at one or more of the user devices 130(1)-130(*n*) may use different graphical user interfaces (GUIs) provided by the virtual assistant server to configure, train, or test the virtual assistants. The virtual assistant server provides a unified interface for the one or more users at one or more of the user devices 130(1)-130(*n*) to train intents, entities, or the like, configured for the virtual assistant. The virtual assistant server also assists the one or more users at one or more of the user devices 130(1)-130(*n*) to train the virtual assistants by providing training status or training suggestions to the one or more users at one or more of the user devices 130(1)-130(*n*)**.

Figure 1:
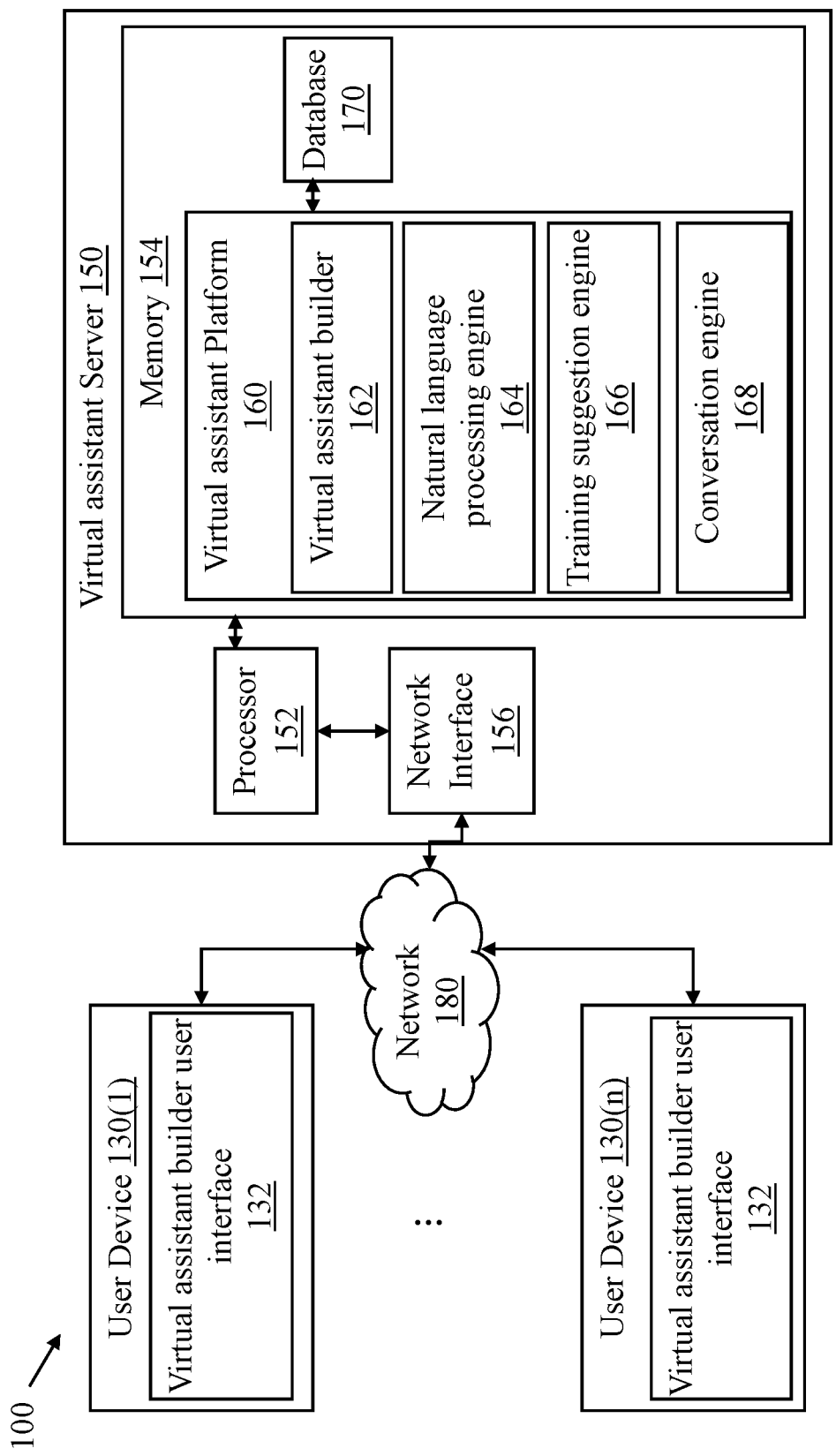
FIG. 1 is a block diagram of an exemplary virtual assistant server environment for implementing the concepts and technologies disclosed herein.

FIG. 1 is a block diagram of an exemplary virtual assistant server environment 100 for implementing the concepts and technologies disclosed herein. The environment 100 includes: a plurality of user devices **130(1)-130(*n*), and a virtual assistant server 150 coupled together via a network 180, although the environment 100 can include other types and numbers of systems, devices, components, and/or elements and in other topologies and deployments. While not shown, the exemplary environment 100** may include additional network components, such as routers, switches and other devices, which are well known to those of ordinary skill in the art and thus will not be described here.

The virtual assistant server 150 includes a processor 152, a memory 154, and a network interface 156, although the virtual assistant server 150 may include other types and/or numbers of components in other configurations. In addition, the virtual assistant server 150 may include an operating system (not shown). In one example, the virtual assistant server 150 and/or processes performed by the virtual assistant server 150 may be implemented using a networking environment (e.g., cloud computing environment). In one example, the capabilities of the virtual assistant server 150 may be offered as a service using the cloud computing environment.

The components of the virtual assistant server 150 may be coupled by a graphics bus, a memory bus, an Industry Standard Architecture (ISA) bus, an Extended Industry Standard Architecture (EISA) bus, a Micro Channel Architecture (MCA) bus, a Video Electronics Standards Association (VESA) Local bus, a Peripheral Component Interconnect (PCI) bus, a PCI-Express (PCIe) bus, a serial advanced technology attachment (SATA) bus, a Personal Computer Memory Card Industry Association (PCMCIA) bus, an Small Computer Systems Interface (SCSI) bus, or a combination of two or more of these, although other types and/or numbers of buses may be used in other configurations.

The processor 152 of the virtual assistant server 150 may execute one or more computer-executable instructions stored in the memory 154 for the methods illustrated and described with reference to the examples herein, although the processor may execute other types and numbers of instructions and perform other types and numbers of operations. The processor 152 may comprise one or more central processing units (CPUs), or general-purpose processors with a plurality of processing cores, such as Intel® processor(s), AMD® processor(s), although other types of processor(s) could be used in other configurations.

The memory 154 of the virtual assistant server 150 is an example of a non-transitory computer readable storage medium capable of storing information or instructions for the processor 152 to operate on. The instructions, which when executed by the processor 152, perform one or more of the disclosed examples. In one example, the memory 154 may be a random access memory (RAM), a dynamic random access memory (DRAM), a static random access memory (SRAM), a persistent memory (PMEM), a nonvolatile dual in-line memory module (NVDIMM), a hard disk drive (HDD), a read only memory (ROM), an erasable programmable read-only memory (EPROM), an electrically erasable programmable read-only memory (EEPROM), a programmable ROM (PROM), a flash memory, a compact disc (CD), a digital video disc (DVD), a magnetic disk, a universal serial bus (USB) memory card, a memory stick, or a combination of two or more of these. It may be understood that the memory 154 may include other electronic, magnetic, optical, electromagnetic, infrared or semiconductor based non-transitory computer readable storage medium which may be used to tangibly store instructions, which when executed by the processor 152, perform the disclosed examples. The non-transitory computer readable medium is not a transitory signal per se and is any tangible medium that contains and stores the instructions for use by or in connection with an instruction execution system, apparatus, or device. Examples of the programmed instructions and steps stored in the memory 154 are illustrated and described by way of the description and examples herein.

As illustrated in FIG. 1, the memory 154 may include instructions corresponding to a virtual assistant platform 160 of the virtual assistant server 150, although other types and/or numbers of instructions in the form of programs, functions, methods, procedures, definitions, subroutines, or modules may be stored. The memory 154 may also include a database 170 which comprises data structures storing information corresponding to the virtual assistant platform 160, although the database may store other types of data and/or programmed instructions. The virtual assistant server 150 receives communication from one or more of the user devices **130(1)-130(*n*) and uses the virtual assistant platform 160 and the database 170** to provide a response to the communication.

The virtual assistant platform 160 comprises instructions corresponding to a virtual assistant builder 162, a natural language processing (NLP) engine 164, a training suggestion engine 166, and a conversation engine 168, although other types and/or numbers of instructions in the form of programs, functions, methods, procedures, definitions, subroutines, or modules may be stored. Examples of the steps or functions performed when the programmed instructions stored in the memory 154 are executed are illustrated and described by way of the figures and description associated with the examples herein.

The virtual assistant builder 162 of the virtual assistant platform 160 may be served from and/or hosted on the virtual assistant server 150 and may be accessible as a website, a web application, or a software-as-a-service (SaaS) application. Users of an enterprise, such as a developer or a business analyst by way of example, may access the functionality of the virtual assistant builder 162, for example, using web requests, application programming interface (API) requests, although the functionality of the virtual assistant builder 162 may be accessed using other types and/or numbers of methods in other configurations. The one or more users at one or more of the user devices **130(1)-130(*n*) may design, create, or train virtual assistants using the virtual assistant builder UI 132 provided by the virtual assistant builder 162. In one example, the functionality of the virtual assistant builder 162 may be exposed as the virtual assistant builder UI 132** rendered in a web page in a web browser accessible using the one or more user devices 130(1)-130(n), such as a desktop or a laptop by way of example. The one or more users at one or more of the user devices 130(1)-130(n) may interact with user interface (UI) components, such as windows, tabs, or icons of the virtual assistant builder UI 132 rendered in the one or more user devices 130(1)-130(n), to create one or more virtual assistants.

The one or more users at one or more of the user devices 130(1)-130(n) may use the UI components, code, or a combination of these provided in the virtual assistant builder UI 132 to configure and test the one or more virtual assistants. The one or more users at one or more of the user devices 130(1)-130(n) may deploy the configured one or more virtual assistants after testing. After the one or more virtual assistants are deployed, the customers of the enterprise may communicate with the one or more virtual assistants to, for example, purchase products, access services provided by the enterprise, raise complaints, or to know information about the services offered by the enterprise. Each virtual assistant may be configured with one or more intents suitable for handling customer utterances and each of the one or more intents may be configured using UI components such as nodes. In one example, the virtual assistant may be configured using other methods, such as software code in other configurations.

The types of nodes provided by the virtual assistant builder UI 132 include: an intent node, an entity node, a service node, a message node, and/or a confirmation node, although other types and/or numbers of nodes may be added in other configurations. The one or more users at one or more of the user devices 130(1)-130(n) may configure the virtual assistant by connecting and configuring multiple nodes in the virtual assistant builder UI 132.

The virtual assistant builder UI 132 provides the enterprise users with a set of development tools to create applications, such as process applications, digital applications, data tables, or the like. The virtual assistant builder 162 described herein can be integrated with different application platforms, such as development platforms or development tools or components thereof already existing in the marketplace, e.g., Facebook® Messenger, Microsoft® Bot Framework, through plug in architectures by way of example.

The NLP engine 164 assists the virtual assistant server 150 with natural language understanding and natural language generation. The NLP engine 164 may incorporate technologies or capabilities including—machine learning, semantic rules, component relationships, neural networks, rule-based engines, or the like. The NLP engine 164 interprets inputs, such as an utterance received from the customer device (not shown), to identify one or more intents of the utterance or one or more entities in the utterance and generates responses to the inputs. The intent of the utterance refers to the intention of the customer—that describes what the customer wants the virtual assistant to do. The entities are, for example, parameters, fields, data, or words required by the virtual assistant to fulfill the intent. For example, in the utterance—"Book me a flight to Orlando for next Sunday," the intent is "Book flight", and the entities are "Orlando" and "Sunday."

The NLP engine 164 also creates and executes language models to classify the utterances into one or more intents configured for the virtual assistant based on the configuration and/or training added to the virtual assistants using the virtual assistant builder 162. Also, the NLP engine 164 may use one or more pre-defined and/or custom-trained language models. The NLP engine 164 may create language models for a virtual assistant to classify an utterance into one of the intents of the virtual assistant or identify one or more entities in the utterance, although other types and/or numbers of functions may be performed by the language models in other configurations. The language models may be machine learning models, rule-based models, predictive models, neural network based models, semantic models, component relationship based models, or artificial intelligence based models, although there may be other types and/or numbers of language models in other configurations. In one example, the NLP engine 164 may update an existing language model or create a new language model after training is added, deleted, or modified in the virtual assistant builder UI 132.

The training suggestion engine 166 determines one or more executable corrective actions based on running a test suite, although the engine can be configured to provide executable corrective actions in other manners. The executable corrective actions when implemented, for example by the user operating the user device 130(1), improve the natural language understanding of the virtual assistant. The training suggestion engine 166 may communicate the determined executable corrective actions with the NLP engine 164 to generate the executable corrective actions in a natural language form. The training suggestion engine 166 may determine the executable corrective actions using rules, predictive models, or other artificial intelligence based techniques. In one example, when the training suggestion engine 166 uses rules, the training suggestion engine 166 may determine a first executable corrective action if the virtual assistant server 150 identifies a false positive in classifying an utterance in the test results. The first executable corrective action may be communicated to the NLP engine 164 which generates the first executable corrective action in a natural language form using the NLP engine 164 and outputs the first executable corrective action in the natural language form to the user device 130(1).

The training suggestion engine 166 may input a <test utterance, one or more expected intents, one or more classified intents, one or more expected entities, one or more classified entities> data structure to the predictive model which determines one or more executable corrective actions based on the input. The predictive model may be trained with the training history of the user, test result history of the user, types of training provided by the user, or best practices in creating training data and test data, although the training suggestion engine 166 may be trained using other types and/or numbers of methods in other configurations. The predictive model determines one or more executable corrective actions based on the input data structure and the training provided to the predictive model.

The conversation engine 168 orchestrates the conversations between the customers and the virtual assistant server 150 by executing configurations of the virtual assistants that are configured by the one or more users at one or more of the user devices 130(1)-130(n). In one example, the conversation engine 168 may be implemented as a finite state machine that uses states and state information to orchestrate conversations between the customers and the virtual assistant server 150. The conversation engine 168 manages the context of a conversation between the customers and the virtual assistants managed and hosted by the virtual assistant server 150. Further, the conversation engine 168 may manage digressions or interruptions provided by the customers during the conversation with the virtual assistant server 150. The conversation engine 168 may communicate with the NLP engine 164 and other components of the virtual assistant server 150 to orchestrate conversations with the customers. In one example, the conversation engine 168 and the NLP engine 164 may be configured as a single component.

The database 170 stores information communicated by the virtual assistant platform 160, although the database 170 may store other types and/or numbers of information in other configurations. The database 170 also stores configuration corresponding to virtual assistants created using the virtual assistant builder 162 in one or more data structures. The virtual assistant platform 160 may communicate with the database 170 to store and retrieve information corresponding to the virtual assistants created using the virtual assistant builder 162. In one example, when an "book flight" intent corresponding to a travel virtual assistant is configured using the virtual assistant builder UI 132 provided by the virtual assistant builder 162, the configuration is stored as one or more data structures in the memory 154 or more specifically in the database 170.

The database 170 may be a relational database, such as a structured query language database, a NoSQL database, a streaming database, a distributed database, a graph database, a time-series database, or other relational or non-relational databases, although the database 170 may comprise other types and/or numbers of databases in other configurations. The data or information stored in the database 170 may be queried. In one example, the database 170 may be a cloud database and hosted external to the memory 154, for example, by a cloud computing service which offers the cloud database as a service.

The network interface 156 may include hardware, software, or a combination of hardware and software, enabling the virtual assistant server 150 to communicate with the components illustrated in the environment 100, although the network interface 156 may enable communication with other types and/or number of components in other configurations. In one example, the network interface 156 provides interfaces between the virtual assistant server 150 and the network 180. The network interface 156 may support wired or wireless communication. In one example, the network interface 156 may include an Ethernet adapter or a wireless network adapter to communicate with the network 180.

The plurality of user devices 130(1)-130(n) may communicate with the virtual assistant server 150 via the network 180. The one or more users at one or more of the user devices 130(1)-130(n) may access and interact with the functionalities exposed by the virtual assistant server 150 via the plurality of user devices 130(1)-130(n). The plurality of user devices 130(1)-130(n) may include any type of computing device that can facilitate user interaction, for example, a desktop computer, a laptop computer, a tablet computer, a smartphone, a mobile phone, a wearable computing device, or any other type of device with communication and data exchange capabilities. The plurality of user devices 130(1)-130(n) may include software and hardware capable of communicating with the virtual assistant server 150 via the network 180. Also, the plurality of user devices 130(1)-130(n) may render and display the information received from the virtual assistant server 150, by way of example, to render an interface which the one or more users at one or more of the user devices 130(1)-130(n) may use to configure the virtual assistants. The plurality of user devices 130(1)-130(n) and the virtual assistant server 150 may communicate via one or more application programming interfaces (APIs) or one or more hyperlinks exposed by the virtual assistant server 150, although other types and/or numbers of communication methods may be used in other configurations.

Also, the plurality of user devices 130(1)-130(n) render and display data received from the virtual assistant server 150 in the virtual assistant builder UI 132. The plurality of user devices 130(1)-130(n) may run applications, such as web browsers or virtual assistant software, which may render the virtual assistant builder UI 132, although other types and/or numbers of applications may render the virtual assistant builder UI 132 in other configurations. In one example, the one or more users at one or more of the user devices 130(1)-130(n) may, by way of example, make selections, provide inputs using the virtual assistant builder UI 132 or interact, by way of example, with data, icons, widgets, or other components displayed in the virtual assistant builder UI 132.

The plurality of user devices 130(1)-130(n) may comprise one or more processors, one or more memories, one or more input devices such as a keyboard, a mouse, a display device, a touch interface, and/or one or more communication interfaces, which may be coupled together by a bus or other link, although the plurality of user devices 130(1)-130(n) may have other types and/or numbers of other systems, devices, components, and/or other elements.

The network 180 enables the plurality of user devices 130(1)-130(n) or other external systems to communicate with the virtual assistant server 150. The network 180 may be, for example, an ad hoc network, an extranet, an intranet, a wide area network (WAN), a virtual private network (VPN), a local area network (LAN), a wireless LAN (WLAN), a wireless WAN (WWAN), a metropolitan area network (MAN), internet, a portion of the internet, a portion of the public switched telephone network (PSTN), a cellular telephone network, a wireless network, a Wi-Fi network, a worldwide interoperability for microwave access (WiMAX) network, or a combination of two or more such networks, although the network 180 may include other types and/or numbers of networks in other topologies or configurations.

The network 180 may support protocols such as Session Initiation Protocol (SIP), Hypertext Transfer Protocol (HTTP), Hypertext Transfer Protocol Secure (HTTPS), Media Resource Control Protocol (MRCP), Real Time Transport Protocol (RTP), Real-Time Streaming Protocol (RTSP), Real-Time Transport Control Protocol (RTCP), Session Description Protocol (SDP), Web Real-Time Communication (WebRTC), Transmission Control Protocol/Internet Protocol (TCP/IP), User Datagram Protocol (UDP), or Voice over Internet Protocol (VoIP), although other types and/or numbers of protocols may be supported in other topologies or configurations. The network 180 may also support standards and/or formats such as, for example, hypertext markup language (HTML), extensible markup language (XML), voiceXML, call control extensible markup language (CCXML), JavaScript object notation (JSON), although other types and/or numbers of data, media, and document standards and formats may be supported in other topologies or configurations. The network interface 156 of the virtual assistant server 150 may include any interface that is suitable to connect with any of the above-mentioned network types and communicate using any of the above-mentioned network protocols.

Figure 2A:
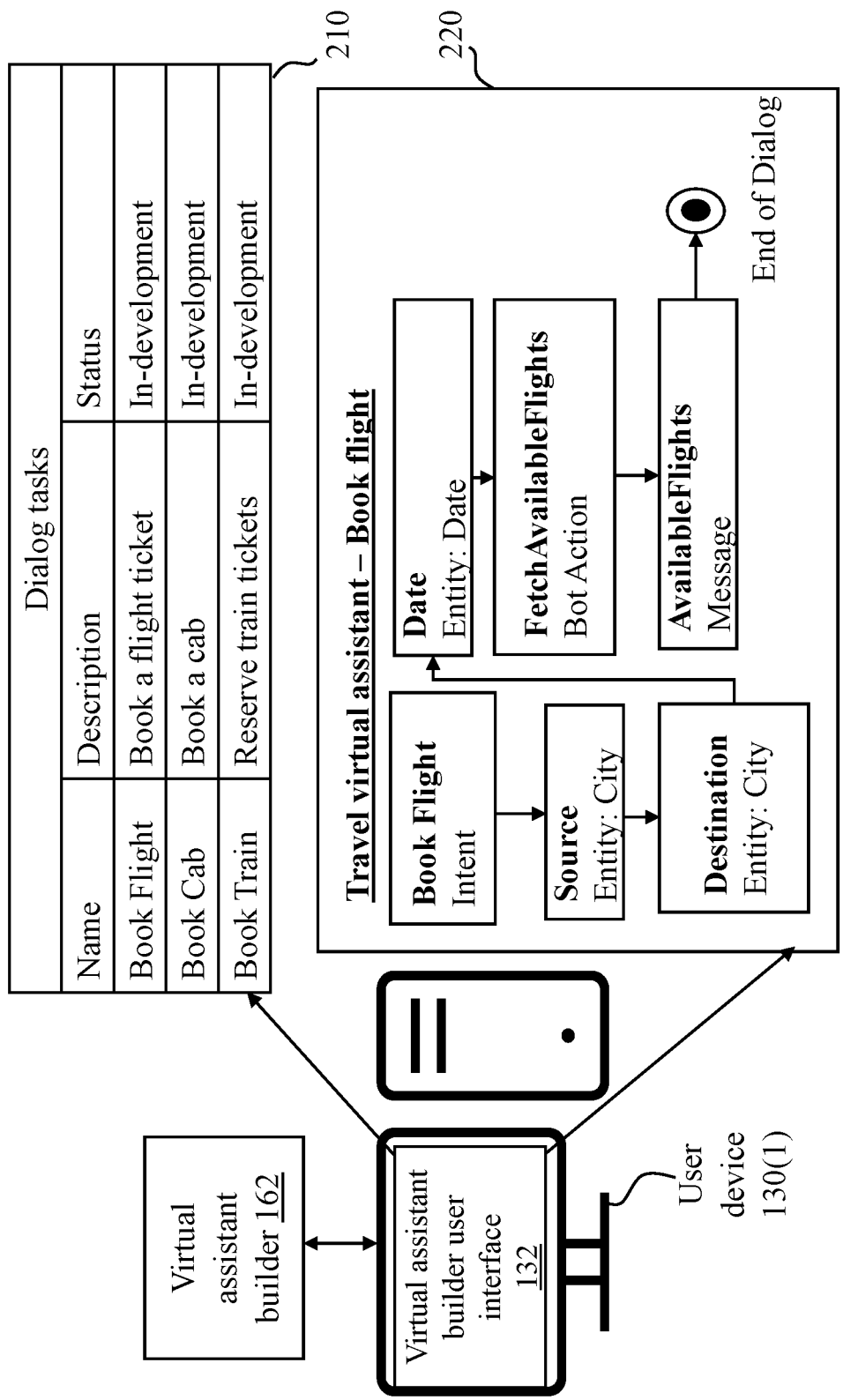
FIG. 2A is a partial block diagram of the environment shown in FIG. 1 with exemplary wireframes from a virtual assistant builder user interface for displaying a virtual assistant configuration.

FIG. 2A illustrates examples of wireframes from the virtual assistant builder UI 132 for displaying a virtual assistant configuration, for example, in the user device 130(1). The user device 130(1) may display the example wireframes in the virtual assistant builder UI 132 based on instructions or information received from the virtual assistant server 150. In this example, the wireframes 210, 220 correspond to a travel virtual assistant created using the virtual assistant builder UI 132, although other types and/or numbers of information may be displayed in the virtual assistant builder UI 132 in other configurations. The wireframe 210 illustrates a list of intents—book flight, book train, and book cab configured for the travel virtual assistant. The wireframe 220 illustrates a dialog flow of the "book flight" intent. Upon detection of the "book flight" intent, the virtual assistant server 150 executes the dialog flow illustrated in the wireframe, although there may be other types and/or numbers of dialog flows associated with the "book flight" intent in other configurations. It may be understood that users may create other types and/or numbers of virtual assistants using the virtual assistant builder UI 132.

Figure 2B:
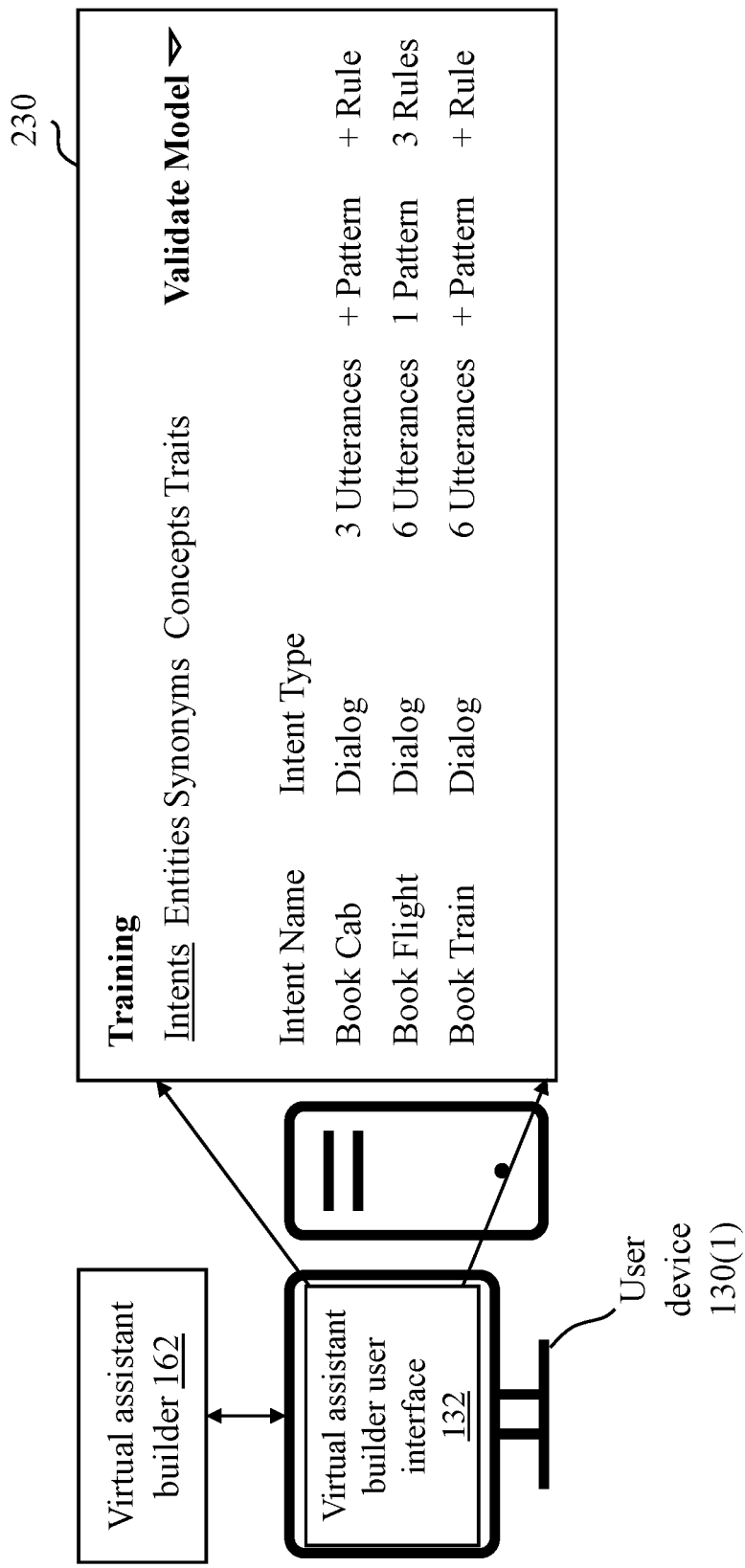
FIG. 2B is a partial block diagram of the environment shown in FIG. 1 with another exemplary wireframe from the virtual assistant builder user interface for displaying the virtual assistant configuration.

FIG. 2B is another example wireframe from the virtual assistant builder UI 132 for displaying virtual assistant configuration, for example, in the user device 130(1). The user device 130(1) may display the example wireframe in the virtual assistant builder UI 132 based on instructions or information received from the virtual assistant server 150. In this example, the wireframe 230 corresponds to the training provided to the travel virtual assistant created using the virtual assistant builder UI 132, although other types and/or numbers of information may be displayed in the virtual assistant builder UI 132 in other configurations. The wireframe 230 illustrates different types of training provided by the one or more users at one or more of the user devices 130(1)-130(n) to the intents of the travel virtual assistant. The training utterances, patterns, and rules provided by the one or more users at one or more of the user devices 130(1)-130(n) are used by the NLP engine 166 of the virtual assistant server 150 to create, for example, one or more language models to classify an utterance into one of the intents configured for the virtual assistant, although other types and/or numbers of training may be provided in other configurations. The one or more users at one or more of the user devices 130(1)-130(n) may also provide training to the virtual assistant server 150 to identify entities in utterances. In this example, the training provided to detect the "book flight" intent includes 4 utterances, 1 pattern, and 3 rules. The NLP engine 166 may create a language model using the training utterances to detect the "book flight" intent in utterances provided by the customers.

For the travel virtual assistant illustrated in FIG. 2B, the user accessing the user device 130(1) may add, modify, or delete from a first version of training data of the "book flight" intent and train the travel virtual assistant with a second version of the training data. As illustrated in FIG. 2B, the user at the user device 130(1) may add training utterances, patterns, or rules to the one or more intents configured for the travel virtual assistant. The NLP engine 166 of the virtual assistant server 150 may, based on the training data, create a first language model corresponding to the travel virtual assistant. The NLP engine 166 may create a second language model when the user at the user device 130(1) trains the travel virtual assistant with the second version of the training data. The test data may be provided by the one or more users at one or more of the user devices 130(1)-130(n) as a test suite, or a part of the first version of the training data provided by the one or more users at one or more of the user devices 130(1)-130(n) may be used as the test suite. Some of the utterances provided by the user for training may be used as test data. The user at the user device 130(1) may also provide additional utterances for testing, for example, as a test suite.

The virtual assistant server 150 stores all the changes made to the first version of the training data in the memory 154, for example, the changes made to the training utterances, training patterns, or rules of the virtual assistant. The changes made to the first version of the training data may be saved as, for example, change logs and stored in the memory 154.

Training Assistance to Users

The virtual assistant server 150 provides one or more executable corrective actions to one or more of the user devices 130(1)-130(n) to train the virtual assistants created using the virtual assistant server 150. The executable corrective actions may be displayed in the virtual assistant builder UI 132. The executable corrective actions may be provided individually or grouped together and provided as a list of executable corrective actions. In one example, the list of executable corrective actions may require that the user at one of the user devices 130(1)-130(n) perform the executable corrective actions in a specific order. The executable corrective actions provide guided instructions for the user at one of the user devices 130(1)-130(n) to train the virtual assistant and significantly reduce the time and effort to train, test, and deploy the virtual assistant. In one example, the executable corrective actions may be "modify the utterance or use utterance testing," "delete this utterance in the intent—book flight, and add the utterance to the intent—book cab," "the changes to the training resulted in more false positives, 1. Review the second version of the training data 2. Revert the changes made to the first version of the training data," or the like. The executable corrective actions provide visibility to the user about the ability of the virtual assistant to accurately respond to utterances or queries.

The training suggestion engine 166 of the virtual assistant server 150 may generate the one or more executable corrective actions in real-time based on a user interaction in the virtual assistant builder UI 132, when the first version of the training data is changed to a second version of the training data and the user trains the virtual assistant, or periodically.

Figure 3:
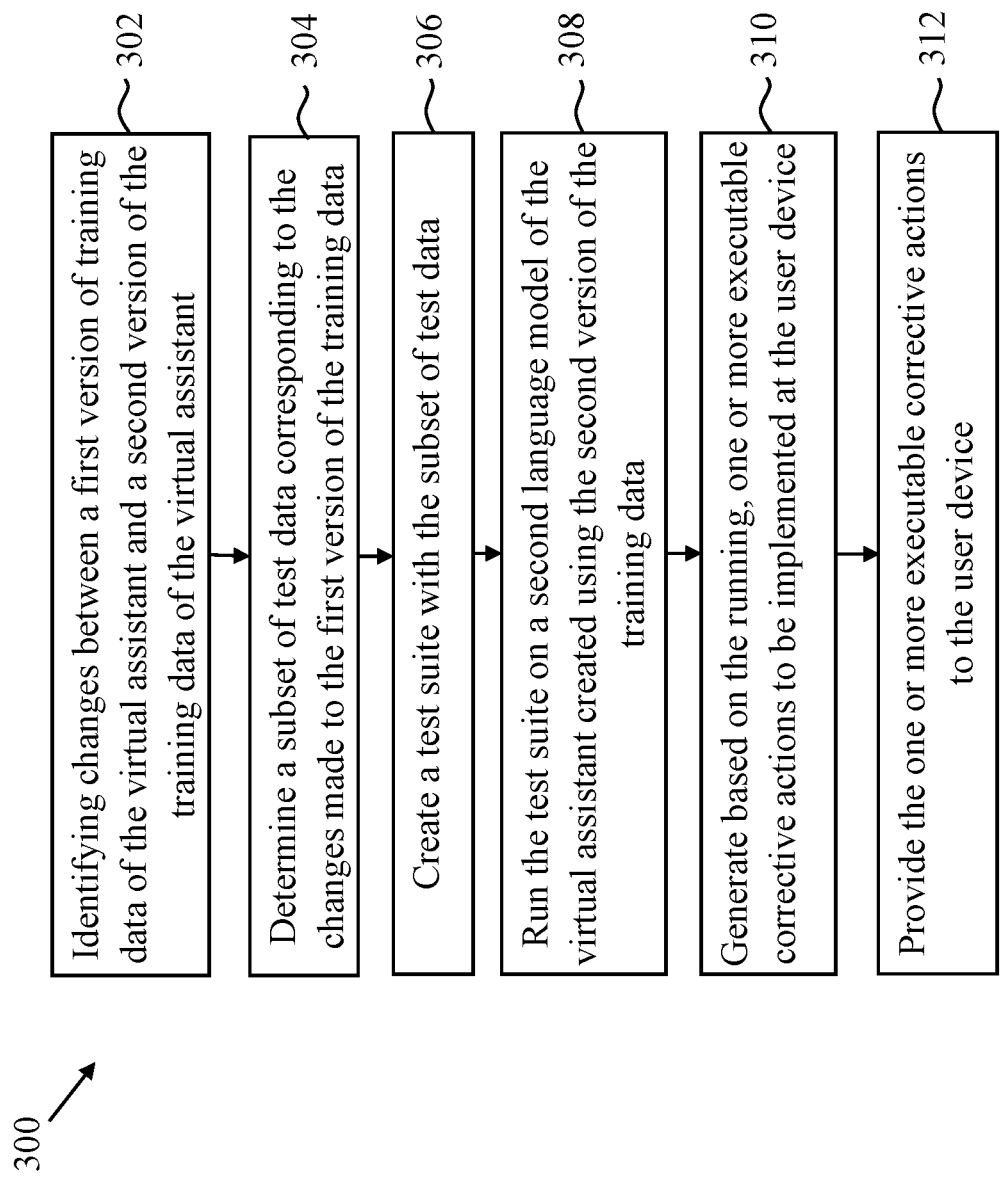
FIG. 3 is a flowchart of an exemplary method for assisting users of the virtual assistant server to configure virtual assistants.

FIG. 3 is a flowchart of an exemplary method 300 for assisting one or more users of the virtual assistant server 150 to configure a virtual assistant. The exemplary method 300 may be performed by the system components illustrated in the environment 100 of FIG. 1. In one example, the user, such as a virtual assistant developer, accessing the user device 130(1) may train the virtual assistant using the virtual assistant builder UI 132. The user may train the virtual assistant by providing utterances, patterns, or rules corresponding to the virtual assistant in the virtual assistant builder UI 132, although the virtual assistant may be trained using other types and/or numbers of methods in other configurations.

The training data enables the virtual assistant server 150 to detect one or more intents or one or more entities configured for the virtual assistant from an utterance provided by an end user of the virtual assistant. The user at one of the user devices 130(1)-130(n) also adds test data to the virtual assistant to test if the virtual assistant provides the results expected by the user. The test data may also comprise utterances, patterns, or rules. In one example, the one or more users at one or more of the user devices 130(1)-130(n) may add the training data and the test data using the virtual assistant builder UI 132. The virtual assistant server 150 creates a first language model using the first version of the training data to determine intents and/or entities from customer inputs provided to the virtual assistant.

At step 302, the virtual assistant server 150 identifies changes made to the first version of training data of a virtual assistant in a variety of manners, such as after each change, periodically, when the virtual assistant is trained after the changes are made to the first version of the training data, or every time when the virtual assistant is trained by way of example. For example, the user at one of the user devices 130(1)-130(n) may change the first version of the training data of the virtual assistant hosted and managed by the virtual assistant server 150, when configuring the virtual assistant. In another example, the user at one of the user devices 130(1)-130(n) may change the first version of the training data by adding, removing, or modifying the utterances, patterns, or rules, and train the virtual assistants, although the first version of the training data may be changed using other types and/or numbers of operations in other configurations.

In one example, the user at one of the user devices 130(1)-130(n) may add two training utterances to the training data to create a second version of the training data and train the virtual assistant with the second version of the training data. The virtual assistant server 150 creates a second language model of the virtual assistant using the second version of the training data. Subsequently, the second language model is used by the virtual assistant server 150 to determine intents and/or entities from customer inputs provided to the virtual assistant. In one example, the NLP engine 164 may optimize or update the first language model using the second version of the training data to create the second language model. In another example, the NLP engine 164 may create the second language model from scratch using the second version of the training data.

In other examples, the virtual assistant server 150 may identify the changes to the first version of the training data, after the user at one of the user devices 130(1)-130(n) trains the virtual assistant with the second version of the training data by retrieving the changes made to the first version of the training data from the memory 154. The virtual assistant server 150 may use the change logs to identify and retrieve the changes made to the first version of the training data. In another example, the virtual assistant server 150 may compare the first version of the training data with the second version of the training data to identify the changes made to the first version of the training data of the virtual assistant.

Figure 3A:
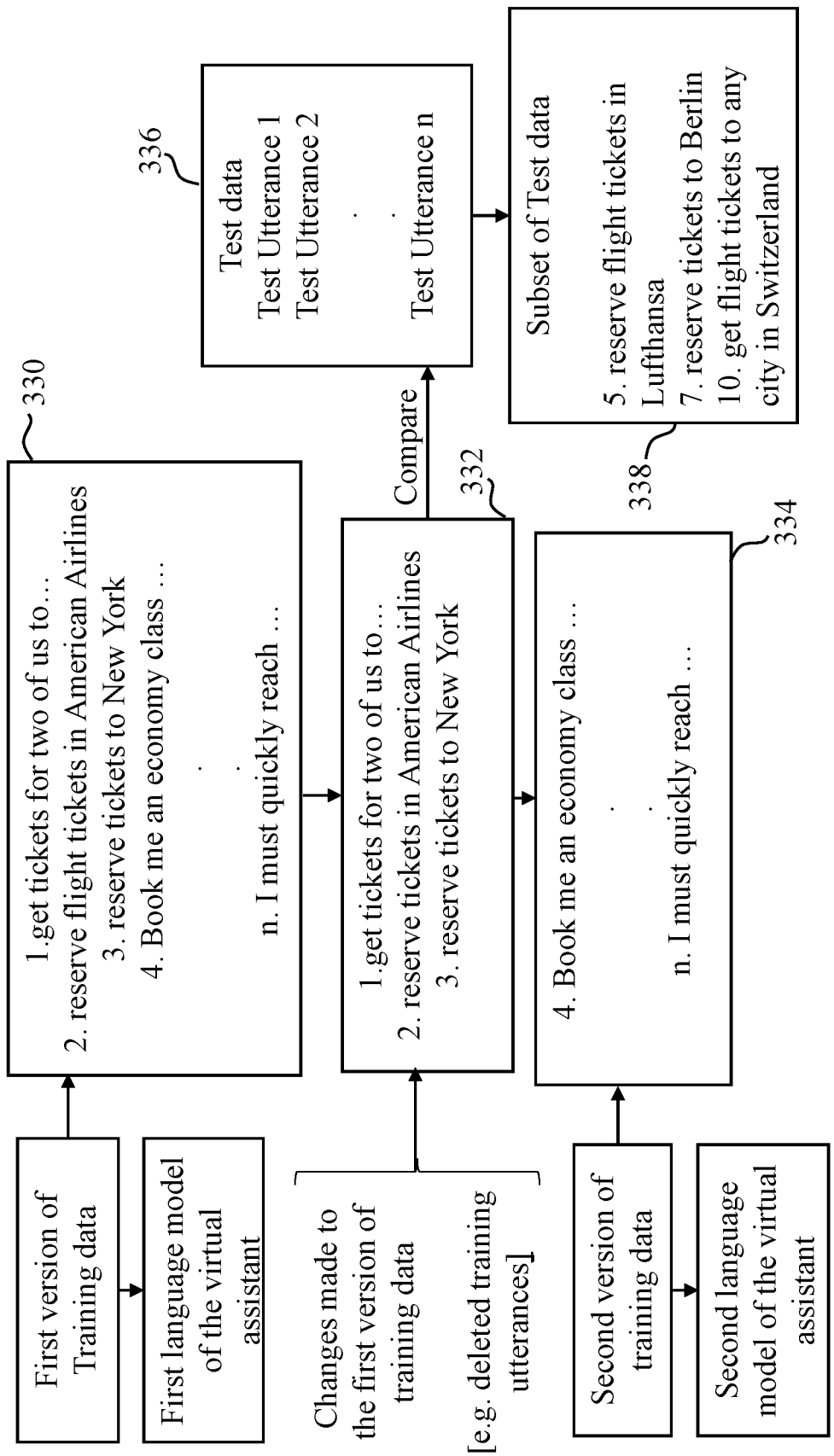
FIGS. 3A and 3B are diagrams of an example change to training utterances and generation of executable corrective actions based on the change to the training utterances
Figure 3B:
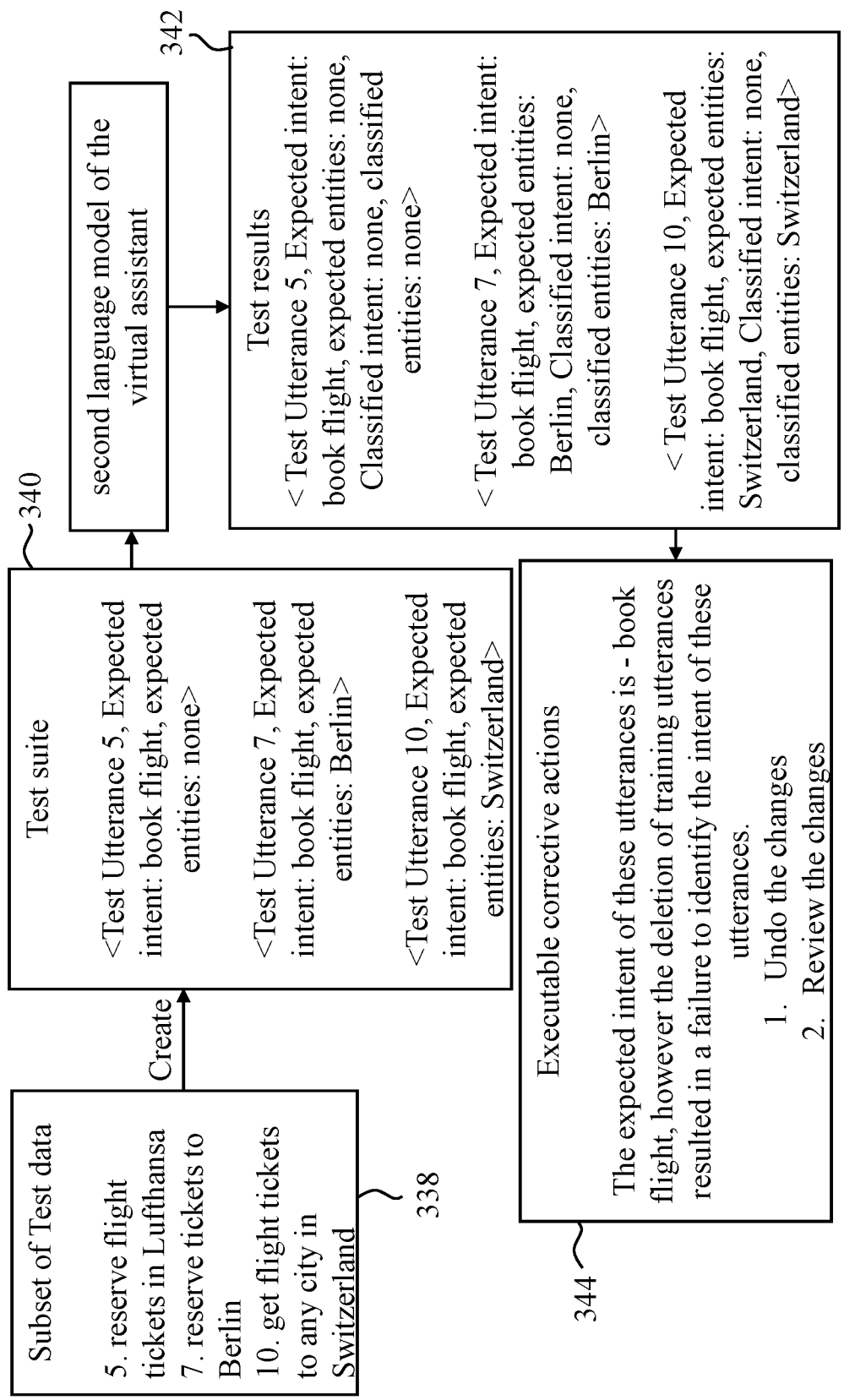

FIGS. 3A and 3B illustrate an example change to training utterances and generation of executable corrective actions based on the change to the training utterances. In FIG. 3A, the user at one of the user devices 130(1)-130(n) deletes the training utterances of the block 332 from the first version of the training data of the block 330 to create the second version of the training data of the block 334. When the user at one of the user devices 130(1)-130(n) trains the virtual assistant with the second version of the training data of the block 334, the virtual assistant server 150 identifies the deleted training utterances of the block 332 as the changes made to the first version of the training data. Also, when the user at one of the user devices 130(1)-130(n) trains the virtual assistant with the second version of the training data of the block 334, the virtual assistant server 150 creates the second language model of the virtual assistant using the second version of the training data of the block 334.

Referring back to FIG. 3, at step 304, the virtual assistant server 150 determines a subset of test data corresponding to the changes made to the first version of the training data. The virtual assistant server 150 may determine which part of the test data is similar to the changes made to the first version of the training data to determine the subset of test data, although other manners for determining the subset of test data can be used. The subset of test data may be, for example, structurally, semantically, or contextually similar to the changes made to the first version of the training data. The comparison of the changes made to the first version of the training data with the test data may be performed using word similarity or sentence similarity techniques used in natural language processing. In one example, the word similarity or sentence similarity techniques use neural network models to understand similarity between sentences. In another example, similarity between the changes made to the first version of the training data and the test data may be determined using techniques such as BERT (Bidirectional Encoder Representations from Transformers), TF-IDF (term frequency-inverse document frequency), cosine similarity, word embedding similarity, sentence encodings, word-to-word based similarity, structure-based similarity, vector-based similarity, or clustering although other types and/or numbers of artificial intelligence based techniques or natural language processing techniques may be used in other configurations.

In one example, the training utterance—"I want to fly from New York to San Diego in economy," may be changed to—"book flight tickets from New York to San Diego in economy." The virtual assistant server 150 determines that the utterance "book flight in economy," in the test data is similar to the changes made to the first version of the training data. As a result, the virtual assistant server 150 determines that the utterance—"book flight in economy" is a part of the subset of test data. In this manner, the virtual assistant server 150 determines the utterances in the test data which are similar to the changes made to the first version of the training data as the subset of test data. Although only test utterances are illustrated in the block 336, the test data comprises the <test utterance, one or more expected intents, one or more expected entities> association.

In the example of FIG. 3A, the changes made to the first version of the training data of the block 332 is compared with the test data of the block 336 to determine the subset of test data of the block 338. The virtual assistant server 150 may determine that the changes made to the first version of the training data of the block 332 is similar to the subset of test data of the block 338.

Referring back to FIG. 3, at step 306, the virtual assistant server 150 creates a test suite with the subset of test data. In one example, the test suite comprises the utterances in the subset of test data, the one or more expected intents, or the one or more expected entities for each of the utterances in the subset of test data. In one example, the test suite comprises the utterance from the subset of test data—"book flight in economy," the expected intent as—"book flight," and the expected entity as—economy. As the subset of test data is determined from the existing test data, the virtual assistant server 150 includes the <test utterance, one or more expected intents, one or more expected entities> association. In one example, as part of adding the test data, the user provides the <test utterance, one or more expected intents, one or more expected entities> association which is stored in the database 170 of the virtual assistant server 150, although the association may be stored in other types and/or numbers of components in other configurations.

In the example of FIG. 3B, the virtual assistant server 150 creates the test suite of the block 340 from the subset of test data of the block 338. The test suite of the block 340 comprises for each utterance of the subset of test data of the block 340, the <test utterance, one or more expected intents, one or more expected entities> information.

At step 308, the virtual assistant server 150 runs the test suite on the second language model of the virtual assistant. Running the test suite comprises providing the utterances in the test suite as inputs to the second language model. The second language model classifies each of the utterances in the test suite into one or more intents configured for the virtual assistant. In one example, the second language model may fail to classify one or more of the utterances in the test suite into one or more intents configured for the virtual assistant. Each utterance of the test suite has one or more expected intents or one or more expected entities and based on running the test suite the virtual assistant server 150 determines a classification of each utterance of the test suite into one or more classified intents or one or more classified entities. Based on running the test suite, the virtual assistant server 150 determines the test results which includes for each utterance in the test suite—the test utterance, one or more expected intents, one or more expected entities, one or more classified intents, one or more classified entities information.

In the example of FIG. 3B, the virtual assistant server 150 runs the test suite of the block 342 on the second language model of the virtual assistant by providing the test suite as an input to the second language model. Based on running the test suite of the block 340, the virtual assistant server 150 determines the test results of the block 342. The test results comprise the <test utterance, one or more expected intents, one or more expected entities, one or more classified intents, one or more classified entities:> key-value pairs of all the test utterances. The one or more classified intents and the one or more classified entities are determined based on running the test suite of the block 340. In one example, each utterance in the test suite, each utterance in the test results may have one or more expected intents, one or more expected entities, one or more classified intents, or one or more classified entities. In another example, one or more utterances in the test suite may have no expected entities, and one or more utterances in the test results may have no classified entities.

At step 310, the virtual assistant server 150 generates based on the running, one or more executable corrective actions to be implemented at the user device 130(1). As the second language model may classify input utterances in a different manner compared to the first language model—determining the subset of test data corresponding to the changed training data, creating a test suite comprising the subset of test data, and running the test suite, enables the virtual assistant server 150 to determine if the changes to the training data causes, for example, unexpected intent classification by the virtual assistant. The one or more executable corrective actions provided by the virtual assistant server 150, when implemented, enables the user at one of the user devices 130(1)-130(n) to act on the unexpected intent classification. In one example, the one or more executable corrective actions comprise: "modify the utterance", "delete the utterance", "modify the utterance to . . . ", "add the utterance to <intent name>", "undo the change made to the utterance", "this utterance identifies <classified intent>, modify the training to identify <expected intent>", or the like.

In the example of FIG. 3B, the virtual assistant server 150 generates based on the running, an executable corrective action of the block 344 to improve the natural language understanding of the virtual assistant server 150. The training suggestion engine 166 of the virtual assistant server 150 generates the executable corrective action of the block 344 based on the test results of the block 342, determined by running the test suite of block 342. The executable corrective action of the block 344 when implemented by the user at one of the user devices 130(1)-130(n), improves the natural language understanding of the virtual assistant server 150 and more specifically results in accurate intent classification by the virtual assistant server 150.

Based on the test results of the block 342, the virtual assistant server 150 determines that the classified intent of the test utterances of the subset of test data is "none". However, the expected intent of the test utterances of the subset of test data is—book flight. As the virtual assistant server 150 is unable to classify the utterances in the subset of test data of the block 338 into an intent configured for the travel virtual assistant, the virtual assistant server 150 may generate an executable corrective action—"The expected intent of these utterances is—book flight, however the deletion of training utterances resulted in a failure to identify the intent of these utterances. 1. Undo the changes 2. Review the changes." When the user at one of the user devices 130(1)-130(n) selects the option 1, the virtual assistant server 150 undoes the deletion of training utterances of the block 332 and trains the virtual assistant. When the user at one of the user devices 130(1)-130(n) selects the option 2, the virtual assistant server 150 redirects the user to the training component of the virtual assistant. The training data of the block 330 and the deleted training utterances of the block 332 may displayed to the user. In this manner, the virtual assistant server 150 provides options to the user at one of the user devices 130(1)-130(n) to quickly act upon and remedy any issues caused by the user training.

In another example, the executable corrective action may be—"The expected intent of these utterances is book flight, however the deletion of training utterances resulted in a failure to identify the intent of these utterances. Click here to undo the deletion and retrain the travel virtual assistant."

In another example, the executable corrective action may be—"The expected intent of these utterances is—book flight, however the modification of training utterances resulted in identifying the intent of these utterances as— book cab. Review the training provided to the intents—book flight and book cab." In this example, the training utterances of the intents—book flight and book cab may be provided as a comparison and the modified training utterances may be highlighted in the virtual assistant builder UI 132 for user review at one of the user devices 130(1)-130(n).

Referring back to FIG. 3, at step 312, the virtual assistant server 150 provides the one or more executable corrective actions to the user device 130(1). The one or more executable corrective actions may be displayed in the virtual assistant builder UI 132 based on the instructions provided by the virtual assistant server 150. FIG. 3C is an example list of executable corrective actions generated by the virtual assistant server 150. The one or more executable corrective actions may be displayed in the training component of the travel virtual assistant. The one or more executable corrective actions may be displayed adjacent to the training utterances on which the one or more executable corrective actions need to be performed.

As described above, the executable corrective actions may be generated in natural language and output to the user device 130(1). In one example, the executable corrective actions may be displayed in the virtual assistant builder UI 132 in proximity to the intent whose training is changed, or in proximity to the training utterances, although the executable corrective actions may be displayed in other sections of the virtual assistant builder UI 132 in other configurations. Although not described, the executable corrective actions may be provided to the user device 130(1) in other interfaces or by other means in other configurations.

Further illustrating the generation of executable corrective actions, in one example, the training utterance U4 of a virtual assistant is changed by the user. The virtual assistant server 150, at step 302, identifies the change to the training utterance U4 and performs the steps 304, 306, 308 of the method 300. Based on running the test suite at the step 308, the virtual assistant server 150 determines the test results which comprise false negatives (e.g. when the expected intent of the test utterance is—book flight, and the classified intent of the test utterance is—none). The virtual assistant server 150 determines that the changed training utterance U4 caused false negatives in the run of the test suite. In this example, the changed training utterance U4 may have caused an increase in the false negatives in the run of the test suite, compared to a previous run of the same test suite or another test suite.

The virtual assistant server 150 predicts which of the training utterances enable the detection of each of the test utterances, by way of example, using word similarity, sentence similarity, sentence structure, or other natural language processing techniques. In one example, the virtual assistant server 150 structurally and/or semantically compares the test utterance with the training utterances and predicts that the training utterances U1, U3, U22 enable the detection of the test utterance U101.

The virtual assistant server 150 identifies if the changed training utterance U4 results in the detection of any of the test utterances. If the changed training utterance U4 did not result in the detection of any of the test utterances, the virtual assistant server 150 determines if the changed training utterance U4 is similar to any of the training utterances, by way of example, using word similarity, sentence similarity, sentence structure, or other natural language processing techniques.

If the changed training utterance U4 did not result in the detection of any of the test utterances, the virtual assistant server 150 may, at step 310, generate an executable corrective action—"undo the change to the training utterance U4, as the change is not enabling the detection of any of the test utterances and the change is causing an increase in false negatives." In one example, the executable corrective action may be presented as a clickable option in the virtual assistant builder UI 132, although other types and/or numbers of presentation methods may be used in other configurations.

In another example, the virtual assistant server 150, at step 310, generates the executable corrective action—"undo the change to the training utterance U4, as the change is not enabling the detection of any of the test utterances and the change is causing an increase in false negatives," if the changed training utterance U4 does not result in the detection of any of the test utterances and if the changed training utterance U4 is not similar to any of the training utterances.

In another example of generating executable corrective actions, the user makes changes to a few training utterances and the virtual assistant server 150, at step 302 of the method 300, identifies the changes to the training utterances and performs the steps 304, 306, 308 of the method 300. Based on running the test suite at the step 308, the virtual assistant server 150 determines the test results which comprise false negatives. The virtual assistant server 150 clusters similar test utterances of the false negatives in the results of the test suite using, by way of example, k-means clustering, density-based spatial clustering of applications with noise (DB-SCAN,) affinity propagation, ordering points to identify the clustering structure (OPTICS), gaussian mixtures, meanshift, although other types and/or numbers of clustering techniques may be used in other configurations.

In one example, test utterances—U20, U32, U42, U54 of the false negatives are clustered by the virtual assistant server 150 into one group. The virtual assistant server 150 may construct one or more utterances similar to the test utterances—U20, U32, U42, U54, and step 310 of the method 300, generate an executable corrective action—"add the <constructed one or more utterances> to the training data to reduce false negatives" or generate another executable corrective action—"add training utterances similar to the <constructed one or more utterances> to reduce false negatives." The one or more utterances similar to the test utterances of a cluster may be constructed using neural language models, long short-term memory models, transformer based models, although other types and/or numbers of utterance construction methods may be used in other configurations.

Running a test suite created using the subset of test data instead of running a test suite with the entire test data advantageously results in less processor computation and smaller memory requirements. Further, the disclosed embodiments enable the virtual assistant server 150 to quickly provide executable corrective actions to the user to improve the training of the virtual assistant.

Having thus described the basic concept of the invention, it will be rather apparent to those skilled in the art that the foregoing detailed disclosure is intended to be presented by way of example only, and is not limiting. Various alterations, improvements, and modifications will occur and are intended for those skilled in the art, though not expressly stated herein. These alterations, improvements, and modifications are intended to be suggested hereby, and are within the spirit and scope of the invention. Additionally, the recited order of processing elements or sequences, or the use of numbers, letters, or other designations therefore, is not intended to limit the claimed processes to any order except as may be specified in the claims. Accordingly, the invention is limited only by the following claims and equivalents thereto.

What is claimed is:

1. A method for assisting a user accessing a user device to train a virtual assistant, the method comprising:
   tracking, by a virtual assistant server, changes between a first version of training data and a second version of the training data of the virtual assistant, wherein at least one of the changes comprises addition, deletion, or modification of an utterance, a pattern, or a rule associated with one or more intents;
   determining, by the virtual assistant server, a subset of test data corresponding to the tracked changes between the first version of the training data and the second version of the training data;
   creating, by the virtual assistant server, a test suite with the subset of test data;
   running, by the virtual assistant server, the test suite on a second language model of the virtual assistant created using the second version of the training data;
   generating, by the virtual assistant server, based on the running the test suite, one or more executable corrective actions to be implemented at the user device;
   providing, by the virtual assistant server, the one or more executable corrective actions to a display of the user device;
   receiving, by the virtual assistant server, a selection of at least one of the one or more executable corrective actions;
   editing, by the virtual assistant server, the second version of the training data based on the received selection; and
   training, by the virtual assistant server, the virtual assistant with the edited second version of the training data.

2. The method of claim 1, wherein the virtual assistant server creates a first language model using the first version of the training data.

3. The method of claim 1, wherein the subset of test data comprises utterances in the test data which are structurally or semantically similar to the changes made to the first version of the training data.

4. The method of claim 1, wherein the test suite is created by using one or more expected intents or one or more expected entities of utterances in the subset of test data.

5. The method of claim 1, wherein the running the test suite determines test results comprising, for each test utterance of the subset of test data: one or more expected intents, one or more expected entities, one or more classified intents, or one or more classified entities.

6. The method of claim 1, wherein the one or more executable corrective actions are generated in natural language.

7. A virtual assistant server comprising:
a processor; and
a memory coupled to the processor which is configured to be capable of executing programmed instructions stored in the memory to:
track changes between a first version of training data and a second version of the training data of a virtual assistant, wherein at least one of the changes comprises addition, deletion, or modification of an utterance, a pattern, or a rule associated with one or more intents;
determine a subset of test data corresponding to the tracked changes between the first version of the training data and the second version of the training data;
create a test suite with the subset of test data;
run the test suite on a second language model of the virtual assistant created using the second version of the training data;
generate based on the run the test suite, one or more executable corrective actions to be implemented at a user device;
provide the one or more executable corrective actions to a display of the user device;
receive a selection of at least one of the one or more executable corrective actions from the user device;
edit the second version of the training data based on the received selection; and
train the virtual assistant with the edited second version of the training data.

8. The virtual assistant server of claim 7, wherein the virtual assistant server creates a first language model using the first version of the training data.

9. The virtual assistant server of claim 7, wherein the subset of test data comprises utterances in the test data which are structurally or semantically similar to the changes made to the first version of the training data.

10. The virtual assistant server of claim 7, wherein the test suite is created by using one or more expected intents or one or more expected entities of utterances in the subset of test data.

11. The virtual assistant server of claim 7, wherein the running the test suite determines test results comprising, for each test utterance of the subset of test data: one or more expected intents, one or more expected entities, one or more classified intents, or one or more classified entities.

12. The virtual assistant server of claim 7, wherein the one or more executable corrective actions are generated in natural language.

13. A non-transitory computer-readable medium having stored thereon instructions which when executed by a processor, causes the processor to:
track changes between a first version of training data and a second version of the training data of a virtual assistant, wherein at least one of the changes comprises addition, deletion, or modification of an utterance, a pattern, or a rule associated with one or more intents;
determine a subset of test data corresponding to the tracked changes between the first version of the training data and the second version of the training data;
create a test suite with the subset of test data;
run the test suite on a second language model of the virtual assistant created using the second version of the training data;
generate based on the run the test suite, one or more executable corrective actions to be implemented at a user device;
provide the one or more executable corrective actions to a display of the user device;
receive a selection of at least one of the one or more executable corrective actions from the user device;
edit the second version of the training data based on the received selection; and
train the virtual assistant with the edited second version of the training data.

14. The non-transitory computer-readable medium of claim 13, wherein the virtual assistant server creates a first language model using the first version of the training data.

15. The non-transitory computer-readable medium of claim 13, wherein the subset of test data comprises utterances in the test data which are structurally or semantically similar to the changes made to the first version of the training data.

16. The non-transitory computer-readable medium of claim 13, wherein the test suite is created by using one or more expected intents or one or more expected entities of utterances in the subset of test data.

17. The non-transitory computer-readable medium of claim 13, wherein the running the test suite determines test results comprising, for each test utterance of the subset of test data: one or more expected intents, one or more expected entities, one or more classified intents, or one or more classified entities.

18. The non-transitory computer-readable medium of claim 13, wherein the one or more executable corrective actions are generated in natural language.

* * * * *